Dec. 4, 1923.                                                              1,476,489
J. H. CARVER
CALCULATOR FOR GEARS
Filed Jan. 12, 1922          2 Sheets-Sheet 1

Inventor:
James H. Carver,
by Albert E. Davis
His Attorney.

Dec. 4, 1923.

J. H. CARVER

CALCULATOR FOR GEARS

Filed Jan. 12, 1922    2 Sheets-Sheet 2

1,476,489

Inventor:
James H. Carver,
by *[signature]*
His Attorney.

Patented Dec. 4, 1923.

1,476,489

UNITED STATES PATENT OFFICE.

JAMES H. CARVER, OF SCHENECTADY, NEW YORK, ASSIGNOR TO GENERAL ELECTRIC COMPANY, A CORPORATION OF NEW YORK.

CALCULATOR FOR GEARS.

Application filed January 12, 1922. Serial No. 528,751.

*To all whom it may concern:*

Be it known that I, JAMES H. CARVER, a citizen of the United States, residing at Schenectady, in the county of Schenectady, State of New York, have invented certain new and useful Improvements in Calculators for Gears, of which the following is a specification.

This invention relates to a calculating device for calculating values which are found useful in determining the application to which a given gear is adapted.

The primary object of the invention is to provide a simple device having relatively movable parts with data arranged thereon and adapted to indicate the above values by a simple adjustment of the relatively movable parts.

More particularly my device is adapted to indicate the pitch line speed of a gear, when the speed of the gear in R. P. M. and the diametrical pitch of a gear are known, by a simple adjustment of the relatively movable parts. It is also adapted to indicate the horsepower capacity per inch of length of a gear, when the pitch diameter, number of teeth and the R. P. M. at which the gear is to run are known.

One advantage of my device is that it makes possible without lengthy and tedious calculations, the determination of the pitch line speed or the horsepower per inch of length of a given gear when the speed and pitch or the speed, pitch and number of teeth respectively of the gear are known.

In gear drives it is very desirable not to overload the gears. It will be seen, therefore, that with the device described the layman will be as competent to determine the pitch line speed in feet per minute or the horsepower capacity per inch of length of a gear as the best qualified engineer and thereby eliminate any possibility of overload on a gear through the lack of engineering advice.

Figures 1, 2:
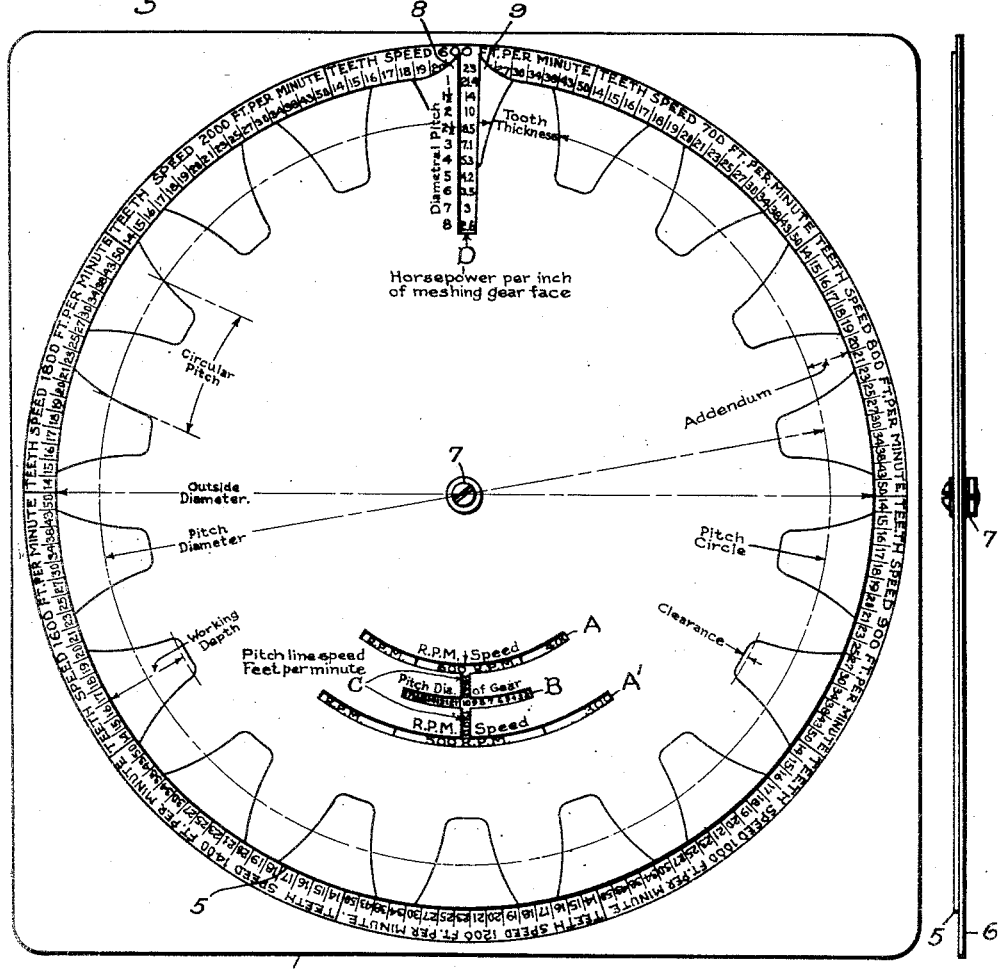
Figure 3:
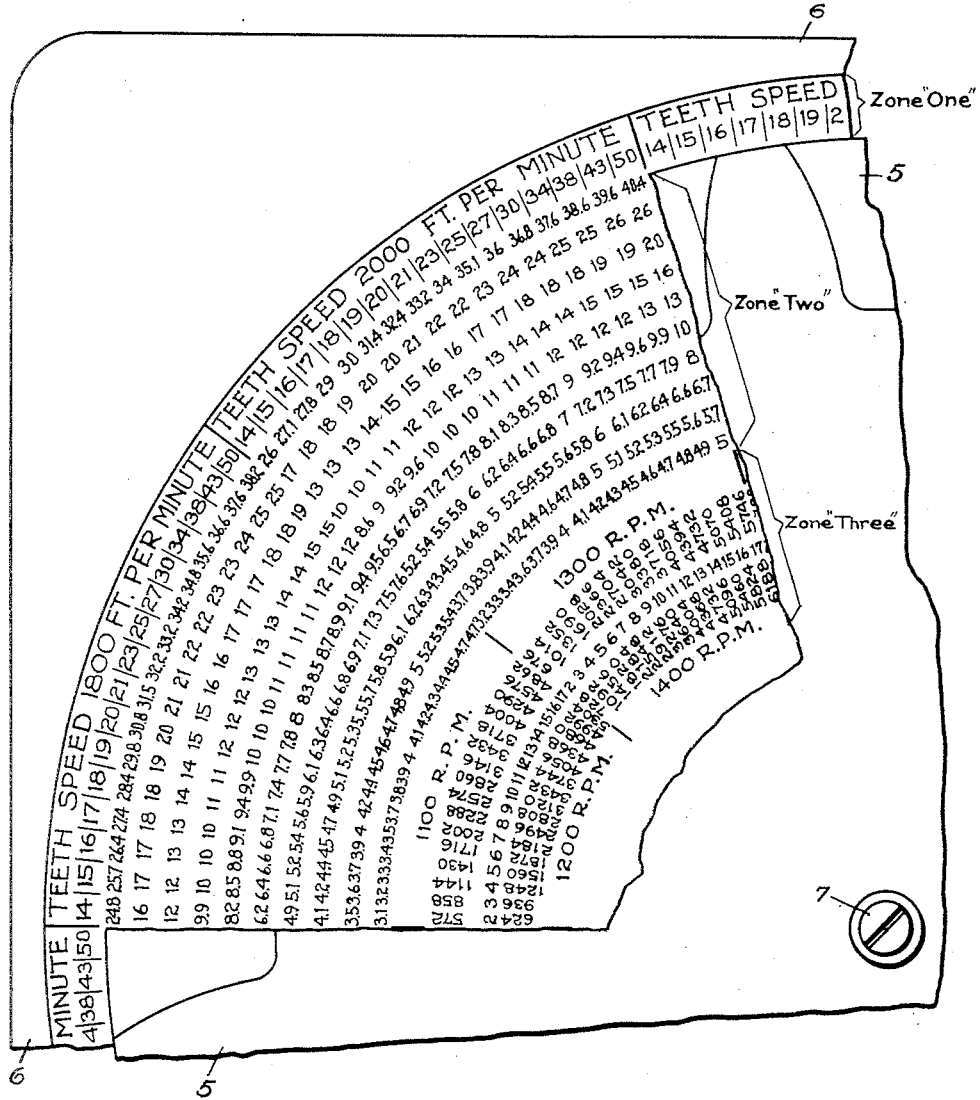

In the drawings Fig. 1 is a plan view of an embodiment of my invention; Fig. 2 is a side view thereof showing the manner of securing the members together, and Fig. 3 is a fragmentary view on an enlarged scale showing the arrangement of the data on the lower disc.

Referring now more particularly to the drawings, I show my device as comprising two relatively movable elements 5 and 6 pivoted together at their centers as indicated at 7. The upper member 5 is disc shaped and smaller than the lower member 6.

The lower or stationary member 6 of my device can be of any convenient shape with gear data arranged thereon. The data are arranged within a circle which is divided into any convenient number of sectors. In the drawings I have shown my device as comprising ten equal sectors, each sector representing a different tooth speed in feet per minute. The speeds shown in the drawing are only illustrative and it should be understood that any speeds can be selected which will be suitable for the range which it is desired to have the device cover. The data in each sector are still further divided into three different zones as indicated on the drawing Fig. 3.

Reading from the outer edge toward the center of the circle, the data in each sector are arranged in the respective zones, as follows:

In the first zone there are two circular rows of data; the first row indicates the tooth speed in feet per minute and the second row indicates the number of teeth in a gear. In the second zone the data are arranged in ten circular rows and radially in line with the respective numbers of teeth in the second row of data in the first zone. These data are derived by the well known Lewis formula for computing strengths of gears i. e.; $w=spfy$ where $w=$ load on tooth in pounds.

$s=$safe working stress of material
$p=$circular pitch
$f=$face width in inches
$y=$constant depending on number of teeth.

The third zone has five circular rows of data. The first and last rows of data in this zone indicate the speed of a gear in R. P. M. The speed in odd hundreds is in the first row and the speed in even hundreds in the last low. The second and fourth rows of data in this zone indicate the pitch line speed in feet per minute. The data in the second line are used in connection with the data in the first line, and the data in the fourth line are used in connection with the data in the fifth line of this zone. The third row of data in this zone indicates the pitch diameter of a gear.

The arrangement of data in zone three is shown only as an illustration of how such data can be arranged and it should be understood that the data in lines 1 and 5 and in lines 2 and 4 can be arranged in two single circular lines where the dimensions of the device will permit.

The upper member 5 is disc shaped. It is provided with a number of slots by which the relative movement of the two members is determined. A slot D is provided projecting radially inwardly from the outer edge of disc 5, and is used to read data in the second zone mentioned above. Diametrically opposite the slot D, a series of concentric arcuate slots A, A' and B and a radial slot C are provided to register with the data in zone three. These slots are of a width and length sufficient to expose for ready selection and reading only a desired portion of the data in this zone and do not intrude upon the adjacent zone two. The arcuate slots A, A' are located so as to register with the first and fifth rows of data in zone three of member 6. The arcuate slot B lying between the slots A and A' is arranged to register with the third row of data in zone three on the lower member 6. The radial slot C lying along a diameter line which passes through the slot D, connects the slots A, A' and B and registers with the second and fourth rows of data in zone three on the lower member 6. The upper end of the slot C is used when speed in R. P. M. is read through arcuate slot A and the lower end of slot C is used when R. P. M. is read through arcuate slot A'. The slot D has a series of numerals which indicate the diametrical pitch of a gear placed along its left edge, each numeral in alignment with a particular row of data in zone two with which it is read. Two ears 8 and 9 adjacent the slot D project beyond the periphery of the disc 5 so as to include the second row of data on lower member 6. These ears act as a pointer for locating the teeth speed in feet per minute in the outer or first zone of data on the lower member 6.

In the drawing (Fig. 1) my device is shown as in a position for determining the horsepower per inch of length of a gear having 23 teeth of 5 pitch and driven at 500 R. P. M.

The operation of my device is best understood by assuming concrete examples:

Example 1; To find the pitch line speed in feet per minute of a gear having a pitch of 5 and a speed of 500 R. P. M.

The slot A' of member 5 is placed so as to register with the numerals 500 R. P. M. in zone three of member 6. The slot C is then aligned with the numeral 5 (diametrical pitch of the gear) on member 6 which is visible through the slot B of member 5. In this position the pitch line speed in feet per minute can be read off through the lower end of slot C, i. e., 650 feet per minute.

Example II; To find the recommended horsepower per inch of effective face of a gear having 23 teeth 5 pitch running at 500 R. P. M.

The slot A' in member 5 is placed so as to register with the numerals 500 R. P. M. in zone three. The slot C is then aligned with the numeral 5 (diametrical pitch of gear) which is visible in zone three through the slot B. In this position the numeral 650 (pitch line speed in feet per minute) registering with the lower end of slot C is read off. Then the disc 5 is turned so that the pointers 8 and 9 point to 600 feet per minute in zone one of member 6 along the outer edge of the disc 5. The speed of 600 feet per minute being selected as it is the next lower speed under 650 feet per minute in the outer zone of data. The lower speed rather than the higher being chosen for reasons of safety only. The slot D is now moved within the 600 feet per minute limits into register with the numeral 23 (the number of teeth on the gear) in the second set of data in zone one. In this position the horsepower of the gear per inch of length can be read in zone two through the slot D and adjacent the numeral 5 (diametrical pitch) on the left hand side of slot D. As shown the horsepower per inch of length of the above gear running at 500 R. P. M. is 4.2 horsepower.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. A calculator for gears comprising two relatively movable members pivoted together, one of said members having arcuate slots therein adapted to register with gear data on the other member, a radial slot on the outer edge of said first member, and pointers adjacent said slot.

2. A calculator for determining the capacity of gears comprising a disc shaped member having a radial slot extending inwardly from its outer edge, a series of arcuate slots connected together by a second radial slot, a second member larger than the first member and gear data on the second member adapted to register with the respective slots in said first member.

3. A calculator for gears comprising two relatively movable members, data arranged on one of said members within three different concentric circular zones, a pointer means on the other of said members for registering with one zone of data, a radial slot for registering with a second zone of data and a group of concentric arcuate slots connected together by a radial slot for registering with a third zone of data.

4. A calculator for gears comprising two members rotatably connected together at their centers, one of said members having gear data thereon arranged in a plurality of sectors of a circle each of said sectors having like data of different values and a second member having a number of radial and arcuate slots adapted to register with the data on the first member.

5. A calculator for gears comprising two relatively movable members connected together at their centers, one of said members having gear data arranged thereon, a radial slot in the other of said members, extending inwardly from its outer edge, portions of the data being visible through said radial slot in the second named member, index numerals adjacent said radial slot adapted to register with a portion of the data on said first named member, and a pointer means formed adjacent said radial slot at the outer edge of said second named member, said pointer means being adapted to register with portions of the gear data on said first named member.

6. A calculator for gears comprising two relatively movable members connected together, one of said members having gear data arranged thereon, a second member having a group of arcuate slots connected together at their centers by a radial slot and adapted to register with a portion of the gear data on said first member.

In witness whereof, I have hereunto set my hand this 11th day of January 1922.

JAMES H. CARVER.